United States Patent [19]

Brandstetter et al.

[11] 4,412,037

[45] Oct. 25, 1983

[54] THERMOPLASTIC MOLDING MATERIALS

[75] Inventors: Franz Brandstetter, Neustadt; Adolf Echte, Ludwigshafen; Hermann Gausepohl, Mutterstadt; Herbert Naarmann, Wattenheim, all of Fed. Rep. of Germany

[73] Assignee: BASF Aktiengesellschaft, Fed. Rep. of Germany

[21] Appl. No.: 302,040

[22] Filed: Sep. 14, 1981

[30] Foreign Application Priority Data

Sep. 20, 1980 [DE] Fed. Rep. of Germany ....... 3035560

[51] Int. Cl.$^3$ .............................................. C08L 61/04
[52] U.S. Cl. ........................................ 525/68; 525/92
[58] Field of Search .................. 260/3, 4 AR; 525/68, 525/92

[56] References Cited

U.S. PATENT DOCUMENTS 3,383,435 5/1968 Cizek ...................................... 525/68
4,128,602 12/1978 Katchman et al. ................... 525/68
4,128,603 12/1978 Katchman et al. ................... 525/68

Primary Examiner—J. Ziegler
Attorney, Agent, or Firm—Keil & Witherspoon

[57] ABSTRACT

Thermoplastic molding materials based on styrene polymers which have been made impact-resistant and on polyphenylene ethers, wherein the particles of the soft component of the styrene polymer which has been made impact-resistant have a mean diameter of more than 1 micron, and wherein the proportion of particles which have a diameter of less than 0.6 micron is not less than 40% by weight and the proportion of particles which have a diameter of from 0.6 to 3 microns is less than 3% by weight.

4 Claims, No Drawings

THERMOPLASTIC MOLDING MATERIALS

The present invention relates to thermoplastic molding materials based on styrene polymers which have been made impact-resistant, and on polyphenylene ethers.

Thermoplastic materials which are suitable for the production of moldings and which contain styrene polymers which have been made impact-resistant and polyphenylene ethers are disclosed, for example, in U.S. Pat. Nos. 3,383,435, 4,128,602 and 4,128,603. Such molding materials can be used for the production of moldings which exhibit better heat-distortion resistance than those made from styrene polymers which have been made impact-resistant but have not been blended with polyphenylene ethers. The physical properties of such molding materials are generally satisfactory, but it has been found that the molding materials have poor flow and that moldings produced from them have inadequate mechanical properties, such as inadequate rigidity.

It is an object of the present invention to provide thermoplastic molding materials, based on styrene polymers which have been made impact-resistant and on polyphenylene ethers, which materials can be converted to moldings having improved properties.

We have found that this object is achieved, according to the invention, by molding materials wherein the particles of the soft component of the styrene polymer which has been made impact-resistant have a mean diameter of more than 1 μm (micron) and wherein the proportion of particles which have a diameter of less than 0.6 μm is not less than 40% by weight and the proportion of particles which have a diameter of from 0.6 to 3 μm is less than 3% by weight.

For the purposes of the invention, the molding materials are usually mixtures which can, by thermoplastic processing within certain temperature ranges, be converted to moldings or to rods, tubes or sheets. The molding materials can be in the form of granules or powder, or be premolded by tableting. They can also be in the form of sheets or webs.

The impact-resistant styrene polymers contained in the molding materials can be prepared by any desired method, provided that it results in the above particle size distributions. However, it is also possible to blend impact-resistant styrene polymers in which the soft components have different particle sizes. The styrene polymers contained in the molding materials according to the invention can be obtained, for example, by mixing polymers having a particular particle size of the soft component with polymers in which the particle size of the soft component is different. For example, 90 parts by weight of a polymer which has a mean particle size of the soft component of 0.5 μm can be blended with 10 parts by weight of a polymer which has a mean particle size of the soft component of 6 μm.

Particularly suitable thermoplastic molding materials are those in which from 95 to 85% by weight of the particles of the soft component have a diameter of from 0.2 to 0.5 μm and 15 to 5% by weight of the particles have a diameter of from 4 to 7 μm.

The thermoplastic molding materials can contain the impact-resistant styrene polymer and the polyphenylene ether in any desired proportion, for example from 5 to 90% by weight of the styrene polymer and from 95 to 10% by weight of the polyphenylene ether. Materials which contain from 20 to 80% by weight of impact-resistant styrene polymer and from 80 to 20% by weight of polyphenylene ether are particularly suitable for the production of moldings.

The most commonly used methods of preparation of impact-resistant styrene polymers are mass polymerization or solution polymerization, as described, for example, in U.S. Pat. No. 2,694,692, and mass-suspension polymerization, as described, for example, in U.S. Pat. No. 2,862,906. Of course, other methods can also be employed, provided they result in the particle size combination described above.

Particularly suitable monovinyl-aromatic compounds are styrene and nuclear-alkylated and sidechain-alkylated styrenes, though preferably styrene alone is used.

The rubbers used in the preparation of the impact-resistant polystyrene are the natural or synthetic rubbers conventionally employed for making styrene polymers impact-resistant. Suitable rubbers, for the purposes of the invention, are not only natural rubber but also, for example, polybutadiene, polyisoprene and copolymers of butadiene and/or isoprene with styrene and other comonomers, provided such copolymers have a glass transition temperature of below −20° C. Butadiene polymers having a 1,4-cis content of from 25 to 98% are particularly suitable.

The impact-resistant polymers having the pattern of properties required according to the invention are prepared by polymerizing the monovinyl-aromatic compounds in the presence of the rubber. As mentioned, this polymerization is as a rule carried out in a conventional manner, as a mass polymerization, solution polymerization or aqueous dispersion polymerization, the rubber first being dissolved in the polymerizable monomer and this starting solution then being polymerized.

In solution polymerization, up to a maximum of 50 percent by weight, based on monovinyl-aromatic compounds employed, of an inert diluent may be added to the above starting solution. Examples of suitable inert diluents are aromatic hydrocarbons or mixtures of such hydrocarbons; toluene, ethylbenzene, the xylenes and mixtures of these compounds are preferred.

In aqueous dispersion polymerization, as a rule no solvent is added; in a particularly advantageous embodiment, the solution of the rubber in the monomers is mass-prepolymerized to a conversion of about 30% under the action of shearing forces, after which the reaction mixture is suspended in water and the polymerization then taken to completion. In general, this process is started by adding oil-soluble initiators which decompose to give free radicals, such as benzoyl peroxide, dicumyl peroxide, di-tert.-butyl peroxide, azo-diisobutyronitrile or the like, or combinations of these, but the prepolymerization can also be started thermally. Suitable suspending agents are the conventional water-soluble, high molecular weight compounds, eg. methylcellulose, hydroxypropylcellulose, polyvinyl alcohol, partially hydrolyzed polyvinyl acetates and the like, and inorganic dispersants, for example barium sulphate. The suspending agents are in general employed in amounts of from 0.1 to 5% by weight, based on the organic phase.

Mass polymerization or solution polymerization is as a rule carried out at from 50° to 250° C., preferably from 100° to 200° C. The polymerization batch must be thoroughly stirred, at least in the first stage of the polymerization, ie. up to conversions of the monovinyl-aromatic compounds of 45% by weight or less. All the above polymerization processes are adequately known and are described in detail in the literature. A summary is given by Amos, Polym. Engng. Sci., 14 (1974), No. 1, 1–11, and in U.S. Pat. Nos. 2,694,692 and 2,862,906, to which reference may be made for further details.

For the purposes of the invention, the soft component is defined as the part of the impact-resistant polymer which is insoluble in toluene at room temperature (25° C.), minus any pigments present. Accordingly, the soft component corresponds to the gel component of the product.

The soft component in general has a heterogeneous structure; the component as a rule forms in the course of the process of preparation and its amount, and degree of sub-division, are affected by the process conditions. As is known, the solution of the rubber in the monovinyl-aromatic monomer separates, immediately after the start of the polymerization reaction, into two phases, of which one, namely a solution of the rubber in the monomeric vinyl-aromatic, initially forms the continuous phase, whilst the other, namely a solution of the polyvinyl-aromatic in its own monomer, remains suspended in droplets in the continuous phase. With increasing conversion, the amount of the second phase increases at the expense of the first, and with consumption of the monomers. At a certain stage, a change in phase continuity occurs, and droplets of rubber solution form in the polyvinyl-aromatic solution; however, these droplets, in turn, contain trapped smaller droplets of what is at that stage the continuous phase.

Alongside this phenomenon, a grafting reaction takes place, in which chemical bonds between the rubber molecules and the polyvinyl-aromatics are formed, with the production of a graft copolymer of the two components. This phenomenon is known and is described in detail by, for example, Fischer, Angew. Makromol. Chem. 33 (1973), 35–74.

The soft component is taken to include both the grafted-on polyvinyl-aromatic and the polyvinyl-aromatic mechanically trapped in the rubber particles.

When the mass has completely polymerized, the resulting product comprises a heterogeneous soft component which consists of grafted rubber particles containing trapped matrix material (polyvinyl-aromatic), and which is embedded in a hard matrix of the polyvinyl-aromatic. The greater the amount of the trapped matrix material, the greater is the amount of the soft component, for a given rubber content.

Accordingly, the amount of the soft component not only depends on the amount of rubber employed but also on how the process is conducted, especially before and during phase inversion. The individual measures are specific to the process and are known to a skilled worker (see, for example, Freeguard, Brit. Polym. J. 6 (1974), 203–228; Wagner and Robeson, Rubber Chem. Techn. 43 (1970), 1129 et seq.).

In order to arrive at impact-resistant thermoplastic materials having the pattern of properties according to the invention, the amount of rubber which, before polymerization, is dissolved in the monomer to prepare the starting solution is chosen, as a function of the final conversion during polymerization, so that the content of soft component in the resulting product, namely a polymer of the monovinyl-aromatic compounds which has been made impact-resistant, is not less than 20% by weight, preferably 25% by weight or more, based on the said impact-resistant polymer. The upper limit of the content of soft component is about 50–60% by weight, and is imposed by the requirement that the polyvinyl-aromatic should form the continuous phase. For the thermoplastic molding materials according to the invention, a soft-component content of 25–35 percent by weight, based on the polymer which has been made impact-resistant, has proved particularly advantageous. The rubber content of the said polymer is then in general from 2 to 20% by weight, preferably from 5 to 15% by weight.

As is explained above and is indeed adequately known, the polymer of the monovinyl-aromatic compounds, which has been made impact-resistant, consists of a homogeneous continuous phase (matrix) of the polymer of the monovinyl-aromatic compound, in which the rubber particles of the soft component are embedded as the disperse phase, the rubber particles having been partially crosslinked and been grafted, to a greater or lesser degree, with the monovinyl-aromatic compounds during the polymerization.

The mean particle size of the disperse soft component can be determined by, for example, counting and evaluating electron microphotographs of thin layers of the impact-resistant polymers (cf. F. Lenz, Zeitschrift für Wiss. Mikroskopie, 63 (1956), 50–56).

In the above process, the particle size of the disperse soft-component phase is adjusted, in a conventional manner, during polymerization of the monovinyl-aromatic compounds, by suitable choice of the speed of stirring in the first stage of the polymerization, ie. up to a monomer conversion of 45% or less. The particle size of the disperse soft-component phase is the greater, the lower the stirrer speed and accordingly the lower the shearing stress. The relation between stirring speed and size and distribution of the rubber particles in the resulting impact-resistant polymer is described, for example, by Freeguard, loc.cit., to whose paper reference may be made for further details. The particular stirring speed required to achieve the desired particle size of the disperse soft-component phase depends, inter alia, on the details of the particular apparatus and is known to a skilled worker or can be determined by a few simple experiments.

The mean particles size (weight average) of the disperse soft-component phase was determined from electron microphotographs of thin layers, by counting and averaging the particles belonging to the same size category (constant interval width). The cumulative distribution curve was determined from the volume of the particles (3rd power of the apparent diameter) within the intervals. The equivalent diameter can then be read off the abscissa as the value corresponding to the 50% ordinate value. The mean diameters quoted are the mean of at least 5,000 particles.

The polyphenylene ethers used are ortho-disubstituted polyphenylene oxides, the ether oxygen of one unit being bonded to the benzene nucleus of the next unit, and at least 50 units being thus linked. The polyphenylene ethers can contain hydrogen, halogen, hydrocarbon radicals free from α-tert.-hydrogen, halohydrocarbon radicals, phenyl radicals and hydrocarbon-oxy radicals in the ortho-position to the oxygen. Accordingly, suitable materials include poly-(2,6-dichloro-1,4-phenylene)-ether, poly-(2,6-diphenyl-1,4-phenylene)-ether, poly-(2,6-dimethoxy-1,4-phenylene)-ether, poly-(2,6-dimethyl-1,4-phenylene)-ether and poly-(2,6-dibromo-1,4-phenylene)-ether, amongst which poly-(2,6-dimethyl-1,4-phenylene)-ether, more especially having an intrinsic viscosity of from 0.45 to 0.65 dl/g (measured in chloroform at 30° C.), is preferred.

The polyphenylene ethers can be prepared from the phenols, for example in the presence of complexing agents such as copper bromide and sec.-dibutylamine.

The mixtures of the impact-resistant styrene polymers and polyphenylene ethers can furthermore contain additives such as pigments, dyes, fillers, flameproofing agents, other compatible polymers, antistatic agents, antioxidants and lubricants.

The thermoplastic molding materials according to the invention are prepared in a conventional manner on equipment which permits mixing the components homogeneously, such as kneaders, extruders or roll mills. In addition to high flow, the molding materials also have other good properties, such as high rigidity and other good mechanical properties.

EXAMPLES AND COMPARATIVE EXPERIMENTS

I. An impact-resistant polystyrene having a mean particle size of the soft component of $\leq 0.6$ µm is obtained by using the following recipe:

A solution consisting of 1,560 g of styrene, 240 g of a butadiene/styrene block copolymer having a gradual transition between the blocks ($[\eta]=1.74$ [dl/g], measured in toluene at 25°; block polystyrene=31.0%; $[\eta]=0.364$ [dl/g], measured in toluene at 25°; total styrene content=41.6%), 1.6 g of t-dodecylmercaptan, 2.2 g of octadecyl 3-(3',5'-di-tert.-butyl-4-hydroxyphenyl)-propionate and 1.7 g of dicumyl peroxide was prepolymerized, in a 5 liter stirred kettle with blade stirrer, at 110° C. internal temperature and a stirrer speed of 150 rpm, until the solids content was 43.8% by weight.

1,800 ml of water containing 9.0 g of polyvinylpyrrolidone of K value 90, and 1.8 g of $Na_4P_2O_7$, were then added and the stirrer speed was increased to 300 rpm. The polymerization was then taken to >99% conversion of styrene by a final treatment of 5 hours at 120° C. and 5 hours at 140° C.

II. An impact-resistant polystyrene having a mean particle size of the soft component of about 6 µm was prepared by the following method:

A solution consisting of 1,283 g of styrene, 112 g of polybutadiene (about 9% by weight of 1,2-vinyl content), 1.5 g of t-dodecylmercaptan, 1.5 g of octadecyl 3-(3',5'-di-tert.-butyl-4'-hydroxyphenyl)-propionate and 1.5 g of dicumyl peroxide was prepolymerized, in a 4 liter stirred kettle with blade stirrer, at 110° C. internal temperature and a stirrer speed of 150 rpm, until the solids content was 25.4% by weight. 1,800 ml of water containing 9 g of polyvinylpyrrolidone of K value 90, and 1.8 g of $Na_4P_2O_7$, were then added and the stirrer speed was increased to 300 rpm. The polymerization was then taken to >99% conversion of styrene by a final treatment of 3 hours at 110° C., 3 hours at 120° C. and 4 hours at 140° C.

III. An impact-resistant polystyrene having a mean particle size of the soft component of 2.5 µm was prepared by the following method:

A solution consisting of 1,283 g of styrene, 112 g of polybutadiene (about 9% by weight of 1,2-vinyl content), 1.5 g of t-dodecylmercaptan, 1.5 g of octadecyl 3-(3',5'-di-tert.-butyl-4'-hydroxyphenyl)-propionate and 1.5 g of dicumyl peroxide was prepolymerized, in a 4 liter stirred kettle with blade stirrer, at 110° C. internal temperature and a stirrer speed of 300 rpm, until the solids content was 25.4% by weight. 1,800 ml of water containing 9 g of polyvinylpyrrolidone of K value 90, and 1.8 g of $Na_4P_2O_7$, were then added and the stirrer speed was increased to 400 rpm. The polymerization was then taken to >99% conversion of styrene by a final treatment of 3 hours at 110° C., 3 hours at 120° C. and 4 hours at 140° C.

The desired mean particle sizes and particle size distributions were obtained by blending the impact-resistant polystyrenes resulting from methods I, II and III.

The parts by weight of impact-resistant polystyrene and of poly-(2,6-dimethyl-1,4-phenylene)-ether shown in the Table, together with, in each case, 0.8 part by weight of tris-(nonylphenyl)-phosphite and 1.5 parts by weight of polyethylene, were melted, homogenized, mixed and granulated on a twin-screw extruder operated at 280° C. The poly-(2,6-dimethyl-1,4-phenylene)-ether had an intrinsic viscosity of 0.48 dl/g.

Test specimens were prepared from the mixtures on an injection molding machine at 280° C.

The breaking energy was determined according to DIN 53,443, page 1, at 23° C., and the modulus of elasticity on test specimens of size $4 \times 10 \times 150$ mm according to DIN 53,457. The flow was assessed in terms of the melt index, according to DIN 53,735.

The results are summarized in the Table.

TABLE

| Examples | Impact-resistant polystyrene | | | Polybutadiene content [parts by weight] | Poly-(2,6-dimethyl-1,4-phenylene)-ether [parts by weight][1] | Melt index, 21.6 kp at 250° C. [g/min] | Breaking energy [Nm] | Modulus of elasticity [Nm/mm²] |
| | [parts by weight] | mean particle size [µm] | Proportion by weight of particles of less than | | | | | |
| | | | 0.6 µm | 0.6–3 µm | | | | | |
| (according to the invention) | | | | | | | | | |
| 1 | 75 | 2.3 | 95 | 0 | 5 | 25 | 145 | 16 | 2350 |
| 2 | 65 | 1.8 | 97 | 0 | 4.5 | 35 | 84 | 21 | 2520 |
| 3 | 65 | 2.3 | 94 | 0 | 4.5 | 35 | 83 | 27 | 2430 |
| 4 | 65 | 2.8 | 90 | 0 | 4.5 | 35 | 80 | 29 | 2650 |
| 5 | 65 | 3.2 | 85 | 0 | 4.5 | 35 | 78 | 29 | 2610 |
| Comparative Experiments (not according to the invention) | | | | | | | | | |
| A | 65 | 0.5 | 100 | 0 | 4.5 | 35 | 75 | 14 | 2630 |
| B | 65 | 2.0 | 30 | 30 | 4.5 | 35 | 76 | 2 | 2600 |
| C | 65 | 2.5 | 0 | 100 | 4.5 | 35 | 36 | 3 | 2650 |

[1] Poly-(2,6-dimethyl-1,4-phenylene)-ether, of intrinsic viscosity 0.48 dl/g

We claim:

1. A thermoplastic molding material based on a blend of impact-resistant styrene polymers in which the soft components of the polymers have different particle sizes and on polyphenylene ethers, wherein the particles of the soft component of the impact-resistant styrene polymers have a mean diameter of more than 1 micron, which soft component is the part of the impact-resistant styrene polymer which is insoluble in toluene at 25° C., minus any pigments present, and wherein the proportion of particles of the soft component of the polymers which have a diameter of less than 0.6 micron is not less than 40% by weight and the proportion of particles of the soft component of the polymers which have a diameter of from 0.6 to 3 microns is less than 3% by weight.

2. A thermoplastic molding material as defined in claim 1 comprising from 20 to 80% by weight of impact-resistant styrene polymer and from 80 to 20% by weight of a polyphenylene ether, wherein from 95 to 85% by weight of the particles of the soft component have a diameter of from 0.2 to 0.5 micron and from 15 to 5% by weight of the particles of the soft component have a diameter of from 4 to 7 microns.

3. A thermoplastic molding material as defined in claim 2, wherein the content of soft component is from 25 to 35% by weight, based on impact-resistant styrene polymers.

4. A thermoplastic molding material as defined in claim 2, wherein the impact-resistant styrene polymers have a polybutadiene rubber content of from 5 to 15% by weight.

* * * * *